S. M. Fox.
Railroad Track.

N° 27,978. Patented Apr. 24, 1860.

WITNESSES:  INVENTOR:

UNITED STATES PATENT OFFICE.

SAMUEL M. FOX, OF NEW YORK, N. Y.

TRACK FOR CITY RAILROADS.

Specification of Letters Patent No. 27,978, dated April 24, 1860.

*To all whom it may concern:*

Be it known that I, SAMUEL M. Fox, of the city, county, and State of New York, have invented, made, and applied to use a certain new and useful Improvement in Tracks for City Railroads; and I do hereby declare that the following is a full, clear, and exact description of the nature of said invention, reference being had to the annexed drawing, making part of this specification, wherein—

Figure 1:
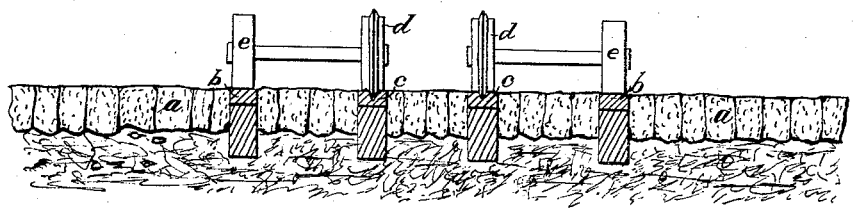
Figure 2:
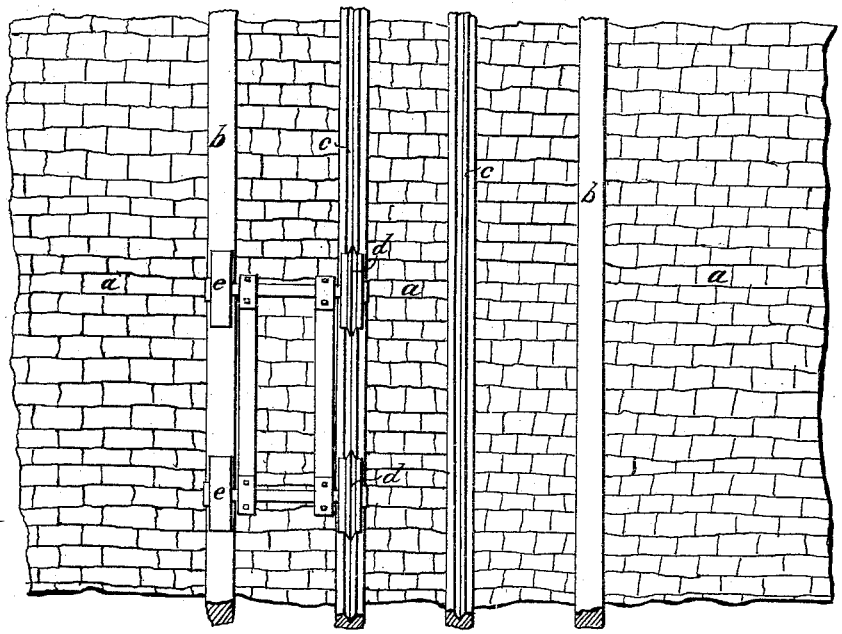

Figure 1, is a cross section of my improved track as laid in a street and Fig. 2, is a plan of the same.

Similar marks of reference denote the same parts.

In the streets of cities, the tracks for railroad cars become a great source of inconvenience in driving carriages and other vehicles, because the wheels get into the track, and if slightly wider than the space between the rails, become wedged in often injuring the wheels or axles, and under all circumstances the rails are a great inconvenience in turning out to pass other vehicles. In all crowded thoroughfares the vehicles go up one side and down the other, hence the outer rails of double tracks are the most inconvenient for other travel.

The nature of my said invention consists in an arrangement of tracks whereby I am enabled to use a grooved rail as a guide for the cars, and a flat rail for the outer wheels, so that by placing the two grooved guiding rails as near as convenient to each other in the center of the street and the flat rails on the outer sides of the track, there is no obstruction to other vehicles, because the flat rail can be traveled on as well as any blocks or paving stones while the grooved rails near the center of the street are out of the way of the respective lines of travel up one side and down the other of the street, and occupy but about two feet instead of about fourteen feet as now used for the tracks and these grooved rails are no inconvenience in crossing because a vehicle would at the center part of the street pass over these rails nearly at right angles, or at a sufficient angle to be uninjured.

In the drawing $a$, is the roadway paved in any usual manner, $b$, $b$, are the outer flat rails, and $c$, $c$, the inner grooved rails. This arrangement of rail however would be useless if the car wheels were all made with flanges; I therefore make the wheels $d$ $d$ with flanges and the wheels $e$, $e$, plain cylinders, as shown, so as to travel on the flat rail.

I do not claim cylindrical or flanged wheels and I am fully aware that tracks have been formed of various kinds of grooved rails, and I am also aware that tramways, and flat rails have been used; I am also aware that a grooved rail has been used with a flat rail in instances where the wheels both had flanges and the edge of the flange traveled on said flat rail as in turning curves, but I am not aware of any previous instance in which two grooved rails have before been arranged in the center part of the street, and flat rails toward the sides, forming the outer rails of the track, when combined with a flanged wheel, and a cylindrical wheel on the same axle of the car taking said track as set forth; therefore

What I claim and desire to secure by Letters Patent is—

The arrangement of the grooved and flat rails for city railroads, combined with the cylindrical and flanged wheels for the cars in the manner and for the purposes set forth.

In witness whereof I have hereunto set my signature this twenty-second day of March, 1860.

SAML. M. FOX.

Witnesses:
LEMUEL W. TERRELL,
CHAS. H. SMITH.